(12) United States Patent
Mevius

(10) Patent No.: US 8,939,167 B2
(45) Date of Patent: Jan. 27, 2015

(54) ADJUSTABLE FIXED PRESSURE RELIEF ASSEMBLY AND REGULATOR COMPRISING SAME

(71) Applicant: Emerson Process Management Regulator Technologies, Inc., McKinney, TX (US)

(72) Inventor: Jason Scott Mevius, McKinney, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 120 days.

(21) Appl. No.: 13/628,761

(22) Filed: Sep. 27, 2012

(65) Prior Publication Data

US 2014/0083528 A1    Mar. 27, 2014

(51) Int. Cl.
*G05D 11/00* (2006.01)

(52) U.S. Cl.
USPC .......................... 137/116.5; 137/270; 251/337

(58) Field of Classification Search
CPC ..................... G05D 16/0663; G05D 16/0669
USPC ............ 137/116.5, 269, 270, 505.32, 505.36, 137/505.37, 505.46, 505.47, 540, 542; 251/337
See application file for complete search history.

(56) References Cited

U.S. PATENT DOCUMENTS

| 1,259,263 | A | * | 3/1918 | Merrick ...................... 123/90.49 |
| 1,435,779 | A | * | 11/1922 | Wright ........................... 251/337 |
| 2,037,340 | A | * | 4/1936 | Rich ........................... 123/188.3 |
| 2,351,874 | A | * | 6/1944 | Parker ......................... 137/493.8 |
| 2,557,187 | A | * | 6/1951 | Hanssen .................... 137/505.46 |
| 2,710,163 | A | * | 6/1955 | Mueller et al. .................... 251/85 |
| 2,867,234 | A | * | 1/1959 | Billington ................ 137/505.11 |
| 3,273,856 | A | * | 9/1966 | Tauschek ....................... 251/337 |
| 3,599,658 | A | * | 8/1971 | Kruzan et al. ............. 137/116.5 |
| 4,265,271 | A |   | 5/1981 | Rosaen et al. |
| 4,433,652 | A | * | 2/1984 | Holtzberg et al. .......... 123/188.3 |
| 4,852,531 | A | * | 8/1989 | Abkowitz et al. .......... 123/188.3 |
| 5,697,398 | A | * | 12/1997 | Gidney et al. .............. 137/484.8 |
| 6,431,205 | B1 | * | 8/2002 | Bartos ....................... 137/505.46 |
| 8,240,327 | B2 | * | 8/2012 | Hawkins et al. ........... 137/489.5 |
| 8,256,446 | B2 | * | 9/2012 | Hawkins et al. ........... 137/116.5 |
| 8,397,743 | B2 | * | 3/2013 | Hawkins et al. ........... 137/116.5 |
| 2008/0258098 | A1 |   | 10/2008 | Hawkins et al. |

FOREIGN PATENT DOCUMENTS

GB    2004975 A    4/1979

OTHER PUBLICATIONS

Search Report for PCT/US2013/061527, mailed Nov. 26, 2013.
Written Opinion for PCT/US2013/061527, mailed Nov. 26, 2013.

* cited by examiner

*Primary Examiner* — John Rivell
*Assistant Examiner* — R. K. Arundale
(74) *Attorney, Agent, or Firm* — Marshall, Gerstein & Borun LLP

(57) ABSTRACT

A pressure relief assembly may include an actuator stem having a plurality of retaining grooves. A relief plate may be operatively connected to the actuator stem and a diaphragm plate may be operatively connected to the actuator stem. A diaphragm may be least partially disposed between the relief plate and the diaphragm plate. A relief spring seat may be releasably attached to the actuator stem at one of the plurality of retaining grooves. The relief spring may be adjusted by moving the attachment point from one retaining groove to another retaining groove.

9 Claims, 3 Drawing Sheets

ADJUSTABLE FIXED PRESSURE RELIEF ASSEMBLY AND REGULATOR COMPRISING SAME

BACKGROUND

1. Field of the Disclosure

The invention generally relates to regulators and more specifically to regulators having an adjustable fixed pressure relief assembly.

2. Related Technology

Fluid flow from one location to another location is often controlled by a valve or regulator. The valve or regulator may be designed to maintain certain flow rates or fluid pressures within a predetermined range. A regulator includes an actuating mechanism that controls a location of a valve plug with respect to a valve seat. The valve plug and valve seat cooperate to control fluid flow through the valve or regulator.

In some environments, such as gas tank operations, the potential exists for fluid pressure to build up to dangerous levels. For example, in the natural gas or propane industry, a regulator valve may control the flow of natural gas or propane out of a tank. As the temperature of the natural gas or propane within the tank increases, the pressure of the natural gas or propane will also increase. If the pressure exceeds a design pressure for the regulator or the tank, material failure may occur, causing danger to lives and property. Thus, most regulators attached to tanks have some sort of pressure relief device either attached to the tank or on the regulator itself.

In some regulators a pressure relief assembly may be located in an actuator housing. The pressure relief assembly includes an actuator stem, a diaphragm plate, a relief plate, and a diaphragm at least partially disposed between the diaphragm plate and the relief plate. A relief spring is disposed between a relief spring seat and the relief plate, the relief spring biasing the relief plate towards the diaphragm, a releasable seal being formed between the diaphragm and the relief plate. Generally speaking, there are two types of relief assemblies, a fixed assembly and an adjustable assembly. The fixed assemblies include a relief spring seat that is fixed to the actuator stem and not movable relative to the actuator stem. Fixed assemblies are set to a single relief pressure and are not adaptable for other set points. However, fixed assemblies are very reliable.

Adjustable assemblies, on the other hand, include an adjustable relief spring seat that is movably attached to the actuator stem with a compression nut. The adjustable relief spring seat may be moved along the actuator stem to adjust a bias generated by the relief spring. Adjustable assemblies are more flexible and may be adapted to different relief pressures. However, adjustable assemblies are more susceptible to failure as the relief spring seat may unexpectedly move along the actuator stem if the compression nut becomes loose. For this reason, adjustable assemblies are less reliable and some regulations prevent the use of adjustable assemblies for certain uses.

SUMMARY OF THE DISCLOSURE

In accordance with one exemplary aspect of the present invention, a pressure relief assembly may include an actuator stem having a plurality of retaining grooves. A relief plate may be operatively connected to the actuator stem and a diaphragm plate may be operatively connected to the actuator stem. A diaphragm may be least partially disposed between the relief plate and the diaphragm plate. A relief spring seat may be releasably attached to the actuator stem at one of the plurality of retaining grooves. The relief spring may be adjusted by moving the attachment point from one retaining groove to another retaining groove.

In accordance with another exemplary aspect of the present invention, a regulator may include a pressure relief assembly and a valve body having a fluid inlet and a fluid outlet. An actuator may be operatively connected to a valve plug by the actuator stem, the actuator moving the valve plug within the valve body to control fluid flow through the valve body.

In further accordance with any one or more of the foregoing aspects, a pressure relief assembly may further include any one or more of the following preferred forms.

The pressure relief assembly may include a plurality of retention stops disposed between the retaining grooves. The pressure relief assembly may include a retaining clip disposed in one of the retaining grooves. The pressure relief assembly may include a relief spring seat disposed on the actuating stem. The pressure relief assembly may include a relief spring disposed between thee relief spring seat and the relief plate. The pressure relief assembly may include a spring guide section on the actuator stem for retaining the relief spring. The pressure relief assembly may include a plug disposed on the actuator stem, the plug coupling the actuator stem to the diaphragm plate. The pressure relief assembly may include a plug flange on the actuator stem. The pressure relief assembly may include a plug seat on the actuator stem. The pressure relief assembly may include a plug groove separating the plug flange and the plug seat. The pressure relief may include a portion of the plug that is disposed in the plug groove. The pressure relief assembly may include a plate attachment flange on the actuator stem. The pressure relief assembly may include an opening in the relief plate, and the plate attachment flange may be coupled to the relief plate through the opening. The pressure relief assembly may include an undercut portion on the actuator stem, the undercut portion being disposed between the plate attachment flange and the plug seat. The pressure relief assembly may include three retaining grooves. The pressure relief assembly may include two retention stops.

DETAILED DESCRIPTION

The adjustable-fixed pressure relief assemblies described herein advantageously provide the ability to adjust a set point of a pressure relief spring seat without risking inadvertent movement of the pressure relief spring seat. Thus, the disclosed adjustable-fixed pressure relief assemblies are more adaptable than traditional fixed assemblies and more secure than traditional adjustable assemblies. Moreover, the disclosed adjustable-fixed pressure relief assemblies are easy to manufacture and install in existing regulators.

Generally speaking, the disclosed adjustable-fixed pressure relief assemblies provide an adjustable relief spring seat that is reliably fixed in position on an actuator stem. Thus, the disclosed adjustable-fixed pressure relief assemblies are reliable and usable in regulators that require a fixed pressure relief assembly by local regulation.

Unless specified otherwise, any of the features or characteristics of any one of the embodiments of the adjustable-fixed pressure relief assemblies disclosed herein may be combined with the features or characteristics of any other embodiments of the adjustable-fixed pressure relief assemblies.

Figure 1:
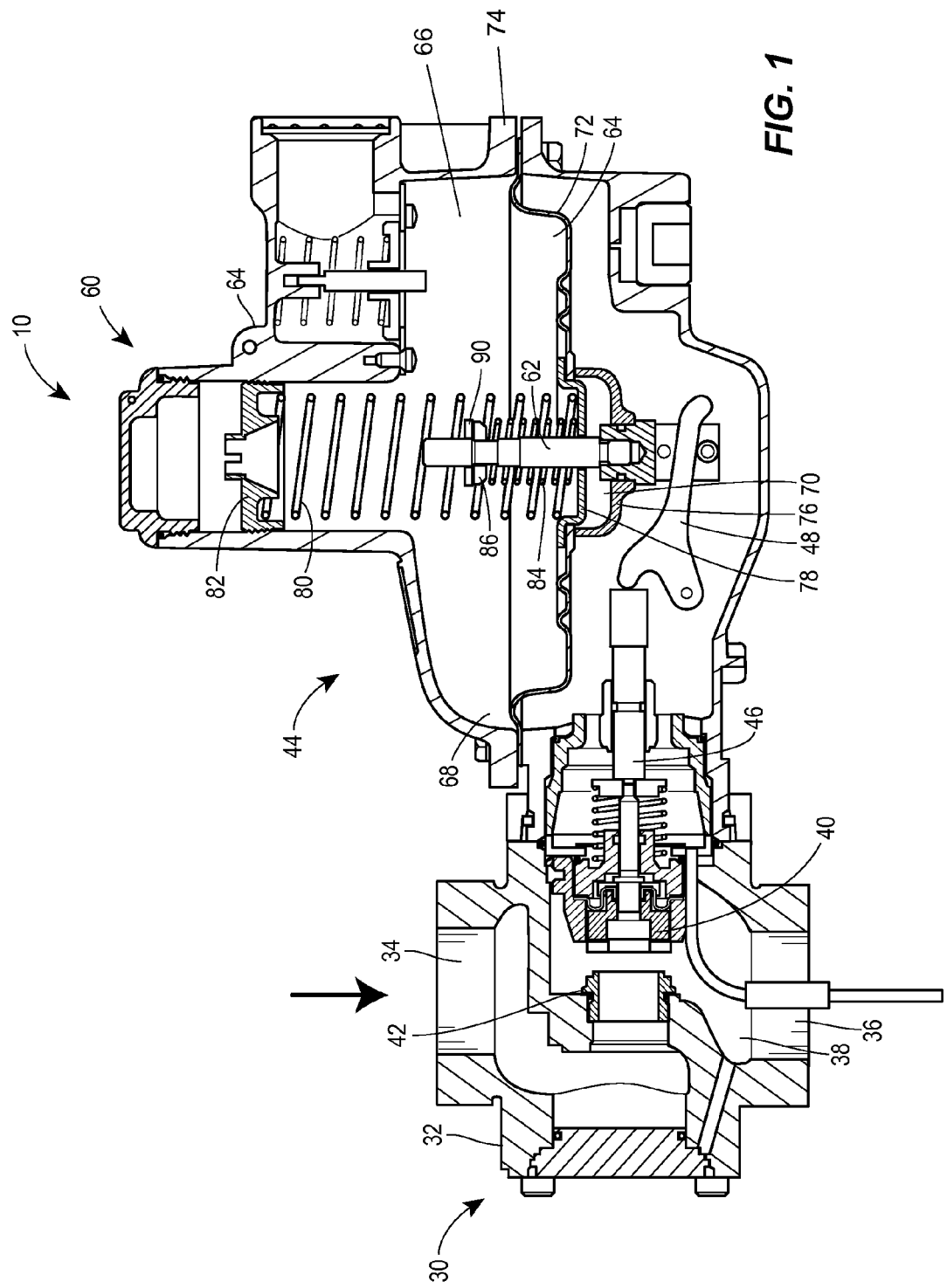
FIG. 1 is a cross-sectional view of an exemplary regulator having an adjustable fixed pressure relief assembly.

Turning now to FIG. 1, a regulator 10 includes a valve 30 and an actuator 60. The valve 30 includes a valve body 32 having a fluid inlet 34 and a fluid outlet 36 connected by a flow corridor 38. The fluid inlet 34 may be connected to a source of fluid, such as a tank (not shown). In one exemplary embodiment, the fluid inlet 34 is connected to a tank of gas, such as a tank of natural gas or a tank of propane. A valve plug 40 and a valve seat 42 are disposed in the flow corridor 38, the valve plug 40 and the valve seat 42 cooperating to control fluid flow through the flow corridor. The valve plug 40 may be operatively connected to the actuator 60 by an actuating assembly 44.

The actuating assembly 44 may include a valve stem 46 operatively connected to a lever 48, which is operatively connected to an actuator stem 62. The actuator 60 moves the actuator stem 62 in response to pressure variations within the valve 30. The actuator stem 62, in turn, moves the lever 48, which moves the valve stem 46. In other embodiments, the valve stem 46 may be directly coupled to, or integrally formed with, the actuator stem 62.

The actuator 60 includes an actuator housing 64 defining a cavity 66. The cavity 66 is divided into a first chamber 68 and a second chamber 70 by a diaphragm 72. The diaphragm 72 is secured to the actuator housing at an attachment flange 74. A diaphragm plate 76 is operatively attached to the actuator stem 62 and the diaphragm plate 76 supports the diaphragm 72 during movement within the cavity 66. The diaphragm plate 76 is disposed between the diaphragm 72 and the second chamber 70. A relief plate 78 is slidably attached to the actuator stem 62. The relief plate 78 generally moves with the actuator stem 62 in response to pressure changes in the second chamber 70. The relief plate 78 is disposed between the diaphragm 72 and the first chamber 68. Said another way, the diaphragm 72 is at least partially disposed between the diaphragm plate 76 and the relief plate 78.

An actuator spring 80 is disposed within the first chamber 68, and is substantially co-axial with the actuator stem 62. The actuator sprig 80 is seated at one end in an actuator spring seat 82 and the relief plate 78 at the other end. A relief spring 84 is also disposed within the first chamber 68, and is substantially co-axial with the actuator stem 62. The relief spring 84 is disposed between the relief plate 78 and a relief seat 86. The relief spring 84 biases the relief plate 78 towards the diaphragm plate 76. However, when fluid pressure in the second chamber 70 exceeds the force generated by the relief spring 84, the relief plate 78 moves away from the diaphragm plate 76, creating a relief passageway for fluid to vent out of the second chamber 70. The second chamber 70 is fluidly connected to the flow corridor 38 upstream of the valve seat 42. Thus, when fluid pressure upstream of the valve seat 42 exceeds a predetermined level, the relief plate 78 moves away from the diaphragm plate 76, which allows fluid to vent out of the valve body 32 and thus, out of a tank (not shown) that may be connected to the valve body 32 to relieve pressure in the valve body 32 and/or in the tank.

Figure 2:
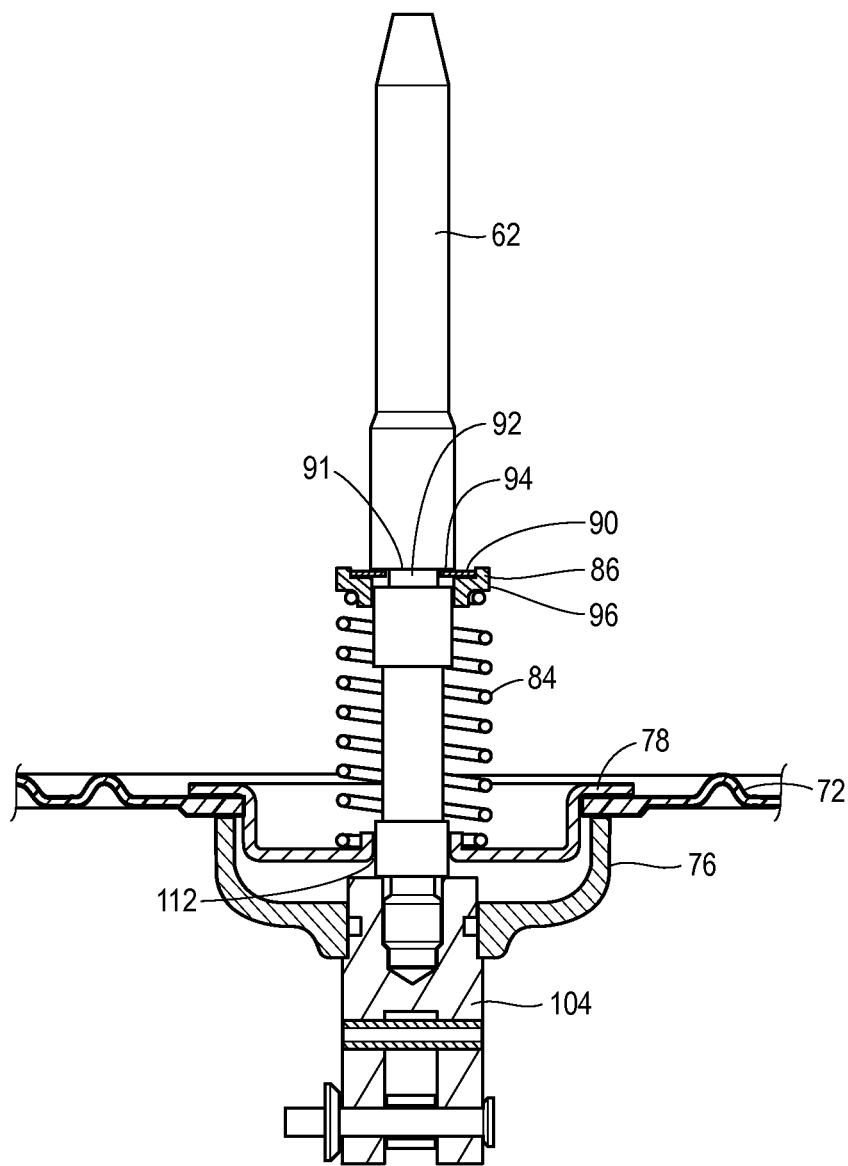
FIG. 2 is a close up cross-sectional view of the adjustable-fixed pressure relief assembly of FIG. 1.
Figure 3:
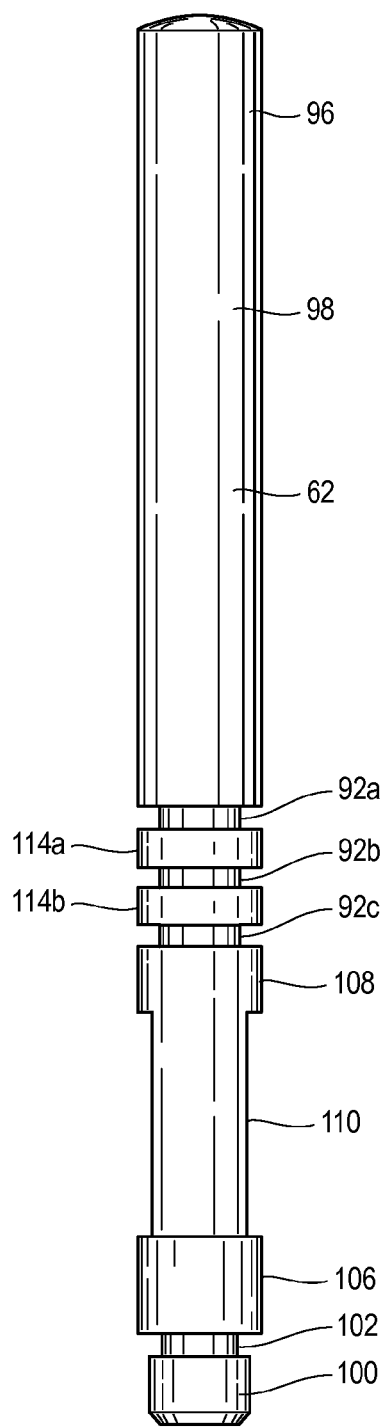
FIG. 3 is a cross-sectional view of the actuator stem of the adjustable-fixed pressure relief assembly of FIG. 2.

The relief spring seat 86 may be movably attached to the actuator stem 62 with an attachment device, such as a retaining clip 90. As illustrated in FIG. 2, the retaining clip 90 may be at least partially disposed in a retaining groove 92 formed on the actuator stem 62. The retaining clip 90 may have an inward annular flange 94 and an outward annular flange 96. The inward annular flange 94 has a smaller inner diameter than an outer diameter of the actuator stem 62. However, the inner annular flange 94 seats within the retaining groove 92, which has an outer diameter that is slightly smaller than the inner diameter of the inward annular flange 94. The retaining clip 90 may have an opening 91 at one side, which allows the retaining clip 90 to expand for removal from the retaining groove 92 and insertion into another retaining groove 92 (see FIG. 3).

In one embodiment, the actuator stem 62 may include a plurality of retaining grooves 92a, 92b, 92c, formed in a body 96 of the actuator stem 62. The actuator stem 62 may include a spring guide section 98 at one end and a plug flange 100 at another end. The spring guide section 98 retains the actuator spring 80 and the relief spring 84. The plug flange 100 and a plug groove 102 cooperate secure a plug 104 (FIG. 2) that retains the diaphragm plate 72. A plug seat 106 prevents the plug 104 from sliding towards the spring guide section 98. A plate attachment flange 108 is separated from the plug seat 106 by an undercut portion 110. The plate attachment flange 108 cooperates with an opening 112 in the relief plate 78 to retain the relief plate 78 on the actuator stem 62. The grooves 92a, 92b, 92c, in the plurality of grooves 92 are separated from one another by a plurality of retention stops 114a, 114b. The retention stops 114a, 114b serve to retain the retaining clip 90 in one of the retaining grooves 92a, 92b, 92c. As the retaining clip 90 is moved from one retaining groove 92a, 92b, 92c to another retaining groove 92a, 92b, 92c, a biasing force generated by the relief spring 84 is changed because a compressed length of the spring is changed. While the embodiment of the actuator stem 62 illustrated in FIG. 3 includes three retaining grooves 92a, 92b, 92c, other embodiments could include more or fewer retaining grooves. For example, other embodiments of the actuator stem 62 may include two, four, five, six, seven, eight, or more retaining grooves.

Although certain adjustable-fixed relief assemblies have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A pressure relief assembly for a regulator, the pressure relief assembly comprising: an actuator stem having a plurality of retaining grooves; a relief plate operatively connected to the actuator stem; a diaphragm plate operatively connected to the actuator stem; a diaphragm at least partially disposed between the relief plate and the diaphragm plate; a relief spring seat releasably attached to the actuator stem at one of the plurality of retaining grooves; a retaining clip disposed in one of the retaining grooves; a relief spring disposed on the actuating stem; a plug disposed on the actuator stem, the plug coupling the actuator stem to the diaphragm plate; a plug flange on the actuator stem, a plug seat on the actuator stem; and a plate attachment flange on the actuator stem, wherein the retaining grooves are separated by a plurality of retention stops, the relief spring is disposed between the relief spring seat and the relief plate, the actuator stem includes a spring guide section for retaining the relief spring, the plug flange and the plug seat are separated by a plug groove, and a portion of the plug is disposed in the plug groove.

2. The pressure relief assembly of claim 1, further comprising an opening in the relief plate, the plate attachment flange being coupled to the relief plate through the opening.

3. The pressure relief assembly of claim 2, further comprising an undercut portion on the actuator stem, the undercut portion being disposed between the plate attachment flange and the plug seat.

4. The pressure relief assembly of claim 3, wherein the plurality of retaining grooves includes three retaining grooves.

5. The pressure relief assembly of claim 4, wherein the three retaining grooves are separated by two retention stops.

6. A regulator for a fluid transfer system, the regulator comprising:
   the pressure relief assembly of claim 1;
   a valve body having a fluid inlet and a fluid outlet; and
   an actuator operatively connected to a valve plug by the actuator stem, the actuator moving the valve plug within the valve body to control fluid flow through the valve body.

7. The regulator of claim 6, further comprising an actuating assembly operatively connecting the valve plug to the actuator.

8. The regulator of claim 7, wherein the actuating assembly includes a valve stem.

9. The regulator of claim 8, wherein the actuating assembly further includes a lever operatively connected to the valve stem and to the actuator stem.

* * * * *

UNITED STATES PATENT AND TRADEMARK OFFICE
CERTIFICATE OF CORRECTION

| | | |
|---|---|---|
| PATENT NO. | : 8,939,167 B2 | Page 1 of 1 |
| APPLICATION NO. | : 13/628761 | |
| DATED | : January 27, 2015 | |
| INVENTOR(S) | : Jason Scott Mevius | |

It is certified that error appears in the above-identified patent and that said Letters Patent is hereby corrected as shown below:

In the Specification:

At Column 3, line 44, "sprig" should be -- spring --.

Signed and Sealed this
Seventeenth Day of May, 2016

Michelle K. Lee
*Director of the United States Patent and Trademark Office*